United States Patent [19]
Horie et al.

[11] Patent Number: 5,991,828
[45] Date of Patent: Nov. 23, 1999

[54] SYSTEM FOR AUTOMATICALLY CONNECTING PORTABLE DEVICE TO NETWORK USING NETWORK ENVIRONMENT INFORMATION INCLUDING DOMAIN NAME OF NAMING DEVICE AND COMMUNITY NAME OF NETWORK MANAGEMENT PROTOCOL

[75] Inventors: Ryuichi Horie; Masahito Toriumi, both of Kawasaki, Japan

[73] Assignee: Fujitsu Limited, Kawasaki, Japan

[21] Appl. No.: 08/954,994

[22] Filed: Oct. 7, 1997

Related U.S. Application Data

[63] Continuation of application No. 08/274,746, Jul. 14, 1994, abandoned.

[30] Foreign Application Priority Data

Aug. 25, 1993 [JP] Japan .................................... 5-210318

[51] Int. Cl.$^6$ .............................. G06F 13/10; G06F 13/20
[52] U.S. Cl. .................................. 710/8; 710/9; 710/15; 709/220; 709/221
[58] Field of Search ..................................... 395/828, 829, 395/835, 500, 200.5, 200.51; 370/95.1; 340/825.52; 710/8, 9, 15; 709/220, 221

[56] References Cited

U.S. PATENT DOCUMENTS

| | | | |
|---|---|---|---|
| 4,677,588 | 6/1987 | Benjamin et al. | 364/900 |
| 5,109,486 | 4/1992 | Seymour | 395/200 |
| 5,150,464 | 9/1992 | Sidhu et al. | 395/200 |
| 5,159,592 | 10/1992 | Perkins | 370/85.7 |
| 5,166,931 | 11/1992 | Riddle | 370/94.1 |
| 5,249,270 | 9/1993 | Stewart et al. | 395/200 |
| 5,265,238 | 11/1993 | Canova, Jr. et al. | 395/500 |
| 5,317,693 | 5/1994 | Cuenod et al. | 395/275 |
| 5,408,618 | 4/1995 | Aho et al. | 395/325 |
| 5,410,543 | 4/1995 | Seitz et al. | 370/85.13 |
| 5,457,680 | 10/1995 | Kamm et al. | 370/17 |
| 5,491,692 | 2/1996 | Gunner et al. | 370/85.13 |

FOREIGN PATENT DOCUMENTS

| | | |
|---|---|---|
| 61-222341 | 10/1986 | Japan . |
| 1-177736 | 7/1989 | Japan . |
| 1-300735 | 12/1989 | Japan . |

*Primary Examiner*—Thomas C. Lee
*Assistant Examiner*—Rehana Perveen
*Attorney, Agent, or Firm*—Staas & Halsey, LLP

[57] ABSTRACT

In a method for automatically address information and network environment information in networks mutually connectable to each other under a predetermined protocol network environment, step (a) is to manage, in a setting device connected to one of the networks, address information and network environment information used for each device connected on of the networks to operate under the predetermined protocol network environment. Step (b) sends, from a setting-needed device moved from one of the networks to another network or newly joined to one of the networks, a request message for requesting address information and network environment information to the setting device. Step (c) makes, in the setting device, a correspondence between a device name of the setting-needed device and a network address of the setting-needed device and sending back a reply message to the setting-needed device from the setting device, the reply message in order to send the address information containing the device name and the network address of the setting-needed device and the network environment information. Step (b) stores, in the setting-needed device, the address information and the network environment information sent from the setting device, so that the setting-needed device can operate under the predetermined network environment.

9 Claims, 6 Drawing Sheets

| F1 | F2 | F3 | F4 | F5 | F6 | F7 | F8 | F9 |

FIG.4

| MAC ADDRESS | IP ADDRESS | HOST NAME | EXCLUSIVE USE/NON-EXCLUSIVE USE | ----- |
|---|---|---|---|---|
|  |  |  |  |  |
|  |  |  |  |  |
| ⋮ | ⋮ | ⋮ | ⋮ |  |

IP ADDRESS | NETWORK # | HOST # |

FIG.5

| IP ADDRESS | HOST NAME | ---------- |
|---|---|---|
|  |  |  |
|  |  |  |
| ⋮ | ⋮ | ⋮ |

SYSTEM FOR AUTOMATICALLY CONNECTING PORTABLE DEVICE TO NETWORK USING NETWORK ENVIRONMENT INFORMATION INCLUDING DOMAIN NAME OF NAMING DEVICE AND COMMUNITY NAME OF NETWORK MANAGEMENT PROTOCOL

This application is a continuation of application Ser. No. 08/274,746, filed Jul. 14, 1994, now abandoned.

BACKGROUND OF THE INVENTION

1. Field of the Invention

The present invention generally relates to information networks, and more particularly to a method for automatically setting address information and network environment information necessary for a device to operate under predetermined network environment such as TCP/IP (Transmission Control Protocol/Internet Protocol) when such a device is newly joined or moved from a position to another position. Further, the present invention is concerned with a system using the above method.

Recently, personal computers of the laptop type or notebook type, UNIX computers and network devices such as relays have been down-sized and reduced in weight. As the number of such portable devices increases, it is increasingly required to connect portable devices to a network at a destination and easily utilize the devices. Hereinafter, the term "network at a destination" means a network which has a network number or a sub-network number different from that of a network to which the devices were originally connected. Hereinafter, such a network is also referred to as a sub-net.

In order to enable the portable device at the destination, it is necessary to reset address information and network environment information concerning the sub-net at the destination to the above portable device. When a large number of portable devices are newly joined in a network, it is necessary to set the following information to each of the portable devices. The information to be set in each of the portable device includes an IP address and a host name (device name), which is some information contained in the address information. The portable devices have different values of the IP address and different values of the host name. Further, the above information includes other information items contained in the address information, the other information items including an IP address of a default gateway, sub-net mask information and so on. The values of the other information items contained in the address information depend on the network management method, and may be the same as each other with respect to all the portable devices. Furthermore, the above information to be set in each of the newly joined portable device includes network environment information including the domain name of a naming device (name server), a community name of an SNMP (Simple Network Management Protocol) and so on. The values of the network environment information depend on the network management method and may be the same as each other with respect to all the portable devices.

2. Description of the Prior Art

In the prior art, in order to move a portable device from a sub-net to another sub-net and enable the user to the portable device connected to the sub-net at the destination, it is required that the user asks a network management person about the address information and the network environment information and sets the received information to the portable device for himself or herself. Further, in order for the portable device at the destination to take place a communication with another device (for example, a business device which stores general databases and files), it is necessary to change the correspondence between the IP address and host name of the portable device moved to the destination, the above correspondence being stored in the above business device. If the correspondence between the IP address and the host name are shared in the network, it is necessary to change the correspondence between the IP address and host name of the portable device moved to the destination, the above correspondence being managed by a name server.

When a large number of devices are newly introduced into the network, it is necessary for a system engineer to set the address information and the network environment information to these devices.

It can be seen from the above that conventionally, it is necessary for the use or the system engineer to correctly set many items of address information and network environment information.

Hence, the conventional method has a disadvantage in that it takes a long time to complete the setting operation by the user or the system engineer in order to enable the portable devices on the PCP/IP network and a disadvantage in that a malfunction may occur due to errors in the manual setting. If the address information is mistakenly set, the network may be confused. The devices on the TCP/IP network cannot operate only by acquiring the IP address if any manual setting is not performed. Regarding the host name, it is necessary to made the host name specifically assigned to the network correspond to the IP address and set the other address information items and the environment information to the devices.

SUMMARY OF THE INVENTION

It is a general object of the present invention to provide a method for automatically setting address information and network environment information to a device connected to a network in which the above disadvantages are eliminated.

A more specific object of the present invention is to provide a method for automatically setting address information and network environment information to a device connected to a network in which address information and network environment information are integrally managed by a setting device, which makes matching among the values of the address information and network environment information and sends the above information to a setting request device in response to a request therefrom, so that the address information and the network environment information can be automatically set to the setting request device rather than the manual setting by the user or the system engineer and the setting request device can operate on a predetermined network protocol such as the TCP/IP.

The above objects of the present invention are achieved by a method for automatically address information and network environment information in networks mutually connectable to each other under a predetermined protocol network environment, the method comprising:

(a) managing, in a setting device connected to one of the networks, address information and network environment information used for each device connected on of the networks to operate under the predetermined protocol network environment;

(b) sending, from a setting-needed device moved from one of the networks to another network or newly joined to one of the networks, a request message for requesting address information and network environment information to the setting device;

(c) making, in the setting device, a correspondence between a device name of the setting-needed device and a network address of the setting-needed device and sending back a reply message to the setting-needed device from the setting device, the reply message in order to send the address information containing the device name and the network address of the setting-needed device and the network environment information; and (d) storing, in the setting-needed device, the address information and the network environment information sent from the setting device, so that the setting-needed device can operate under the predetermined network environment.

Another object of the present invention is to provide a system using the above method.

This object of the present invention is achieved by a system for automatically address information and network environment information in networks mutually connectable to each other under a predetermined protocol network environment, the system comprising:

first means for managing, in a setting device connected to one of the networks, address information and network environment information used for each device connected on of the networks to operate under the predetermined protocol network environment;

second means for sending, from a device moved from one of the networks to another network or newly joined to one of the networks, a request message for requesting address information and network environment information to the setting device;

third means for making, in the setting device, a correspondence between a device name of the setting-needed device and a network address of the setting-needed device and sending back a reply message to the setting-needed device from the setting device, the reply message in order to send the address information containing the device name and the network address of the setting-needed device and the network environment information; and fourth means for storing, in the setting-needed device, the address information and the network environment information sent from the setting device, so that the setting-needed device can operate under the predetermined network environment.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
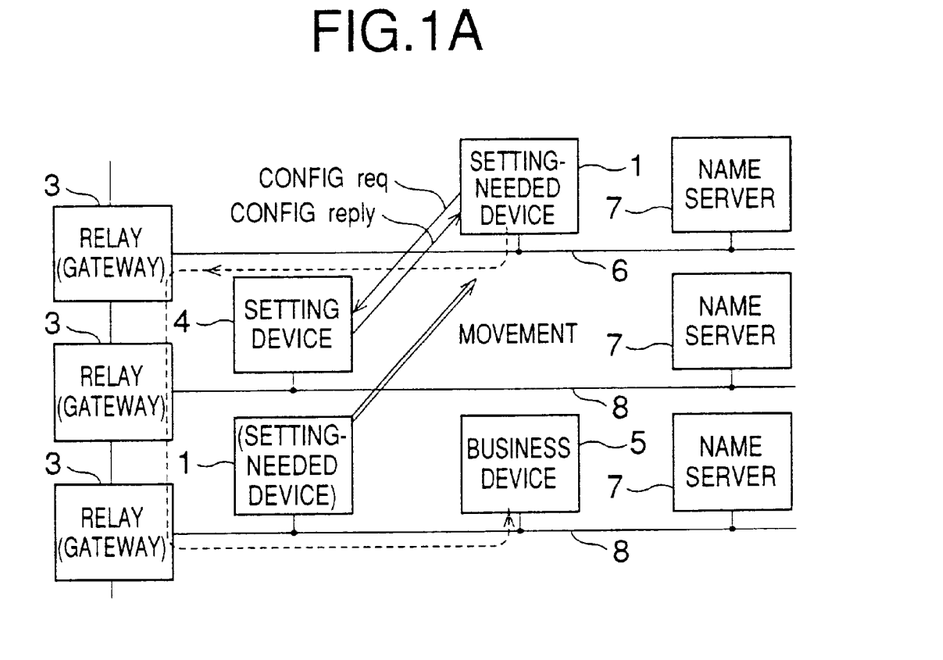
FIGS. 1A and 1B are diagrams for explaining the principle of the present invention.
Figure 1B:
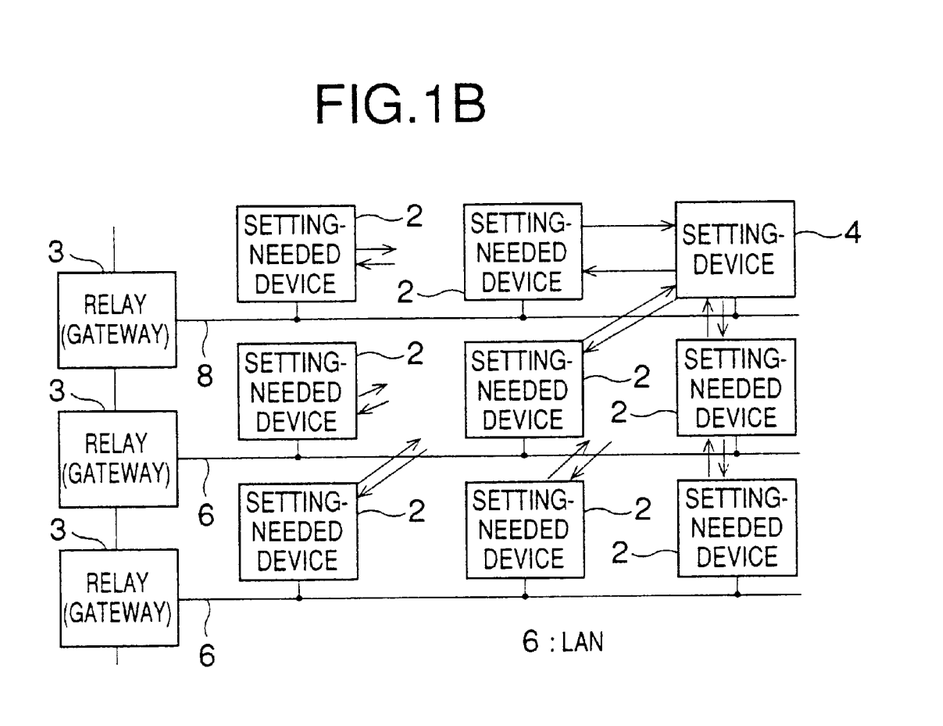

FIGS. 1A and 1B are respectively diagrams of network systems used to explain the principle of the present invention. FIG. 1A shows that a portable device connected to one sub-net is moved to another sub-net. FIG. 1B shows a plurality of portable devices are newly joined in sub-nets.

The network systems shown in FIGS. 1A and 1B include a frame network including relay devices 3 and a plurality of local area networks 6 functioning as sub-nets. The networks 6 are connected to the frame network via the relay devices, and make it possible for the networks 6 to communicate with each other under the TCP/IP network environment. FIG. 1A shows that a setting-needed device (a device operating under the TCP/IP environment is called a host device) 1, which is a portable device, is moved from one network 6 to another network 6. FIG. 1B shows that a plurality of setting-needed devices, which are portable devices, are newly joined to the networks 6. Each of the network systems shown in FIGS. 1A and 1B has a setting device 4, which integrally manage address information and network environment information and assigns the above information to the setting-needed devices 1 and 2 and notifies these derives of the information. The network system shown in FIG. 1A has a business device 5, which performs business communications with the setting-needed device 1. Name servers 7, which are connected to respective networks 6 shown in FIG. 1A, integrally manage the correspondence between the IP address and the host name (device name) on the network.

In the network system shown in FIG. 1A, the portable device 1 is moved from one network 6 to another network 6 and functions as a setting-needed device. The setting-needed device 1 sends the setting device 4 to a message (configuration request: CONFIG req) for requesting address information and network information. The setting device 4 receives the above message and makes the one-by-one correspondence between the host name of the setting-needed device 1 and the IP address thereof on the network. Then, the setting device 4 sends back a reply message (configuration reply: CONFIG reply) to the setting-needed device 1. Then, the address information and the network environment information are sent to the setting-needed device 1 and are automatically set thereto.

In the network shown in FIG. 1B, the setting-needed devices 2 sends the setting device 4 the messages (CONFIG req) for requesting address information and network environment information. The setting device 4 makes the one-by-one correspondence between the host name and IP address of each of the setting-needed devices 2 on the network. Then, the setting device 4 returns reply messages (CONFIG reply) to the setting-needed devices 2.

In the above-mentioned manner, the information necessary to use the TCP/IP network environment is automatically given to each of the setting-needed devices 1 and 2 directly or via the relay devices 3. Hence, the manual setting operation is no longer needed. It is possible to provide the setting device 4 with an interface for releasing (removing) the above necessary information if each of the setting-needed devices 1 and 2 does not need the information any more.

When each of the setting-needed devices 1 and 2 notifies, in a message, the setting device 4 of the host name which each of the setting-needed devices 1 requests to use, the setting device 4 confirms the host name and makes the correspondence between the assigned IP address and the above host name. Hence, each of the setting-needed devices 1 and 2 is capable of using a desired host name.

It is possible to provide each of the setting-needed devices 1 and 2 with a function of containing a notification in the message to be sent to the setting device 4, said notification indicating whether another device is allowed to use, after a predetermined time, the value of the IP address assigned to the setting-needed device which issues the above notification or is inhibited from using the above value of the IP address. Thereby, it is possible to exclusively assign the particular value of the IP address.

The network formation shown in FIGS. 1A and 1B is of a bus type LAN. However, it is possible to employ another type of the network formation, such as a star type LAN or a ring type LAN. Further, it is not limited to use of wire cables. For example, the LAN may employ wireless communications.

A description will be now given, with reference to FIGS. 1A and 1B and other figures, of an embodiment of the present invention.

Each of the setting-needed devices 1 and 2 sends the setting device 4 the message (CONFIG req) for requesting address information and network information necessary for the devices 1 and 2 to operate on the network. For example, each of the setting-needed devices 1 and 2 broadcasts the above message to the network. In response to the above request, the setting device 4 sends each of the setting-needed devices 1 and 2 to the address information and the network environment information together with the reply message (CONFIG reply).

The message used to request the address information and network information is formatted so that the host name which each of the setting-needed devices 1 and 2 requests to use can be specified. Hence, the host name which was previously used in the network 6 by the setting-needed device 1 can be used in the destination network 6. It is also possible to assign the setting-needed device 2 a particular host name. It will be noted that each setting-needed device is called host.

The setting device 4 asks the name server 7 about the IP address and the host name which are some items of the address information sent to the setting device 4 so that the one-by-one correspondence between the IP address and the host name can be established on the network. In the case where the one-by-one correspondence has been established, the setting device 4 asks the associated name server 7, if necessary. Hence, it becomes possible for other devices such as the business device 5 to recognize the new correspondence between the IP address and the host name. The name servers 7, provided in the respective networks 6, manages the correspondence between the IP address and the host name. The host name is formed by a character sequence containing arbitrary alphabets and/or numerals.

The setting-needed device 1 can request the setting device 4 to exclusively assign the IP address and the host name to its own when sending the information request message (CONFIG req) to the setting device 4. In response to the above request, the setting device 1 inhibits the requested IP address and the host name from being assigned to another device. If the request for the exclusive use is not issued, the setting device 1 allows the requested IP address and the host name to be used by another device.

When the setting-needed device 1 needs the IP address and the host name no longer at the time of movement, the setting-needed device 1 sends the setting device 4 a message (REMOVE req) for notifying the setting device 4 of removing (release) of the above IP address and the host name. In receipt of the above message, the setting device 4 sends the setting-needed device 1 a message (REMOVE reply) indicating that the requested removing is successful. After a predetermined time, the setting device 4 can assign the removed IP address or the host name to another device.

In the case where the setting-needed device 1 connected to a network 6 has requested exclusive use of the IP address and the host name at the time of sending the information request message to the setting device 4, if the above setting-needed device 1 is detached from the above network 6 and is connected thereto again, the setting-needed device 1 can send the setting device 4 a message (CHECK req) for requesting confirmation of use of the above IP address and the host name. The setting device 4 can deal with the above message (CHECK req) more easily than the information request message (CONFIG req). In order to send the setting-needed device 1 confirmation of use of the IP address and the host name, the setting device 4 sends back a reply message (CHECK reply) to the setting-needed device 1.

Each of the setting-needed devices 1 and 2 sends the messages by setting, in the messages CONFIG req and CHECK request, broadcast addresses receivable by all devices connected to the networks 6 as a physical address and the IP address. In a case where the setting-needed device 1 or 2 is connected to a network 6 different from the network 6 to which the setting device 4 is connected, the relay device or devices 3 located therebetween pass the broadcast addresses. The setting-needed devices 1 and 2 do not know their own IP addresses at this time, the receivable IP addresses are only the broadcast addresses.

Each of the relay devices 3 transfers the received information request message to the setting device 4 in order to make the information request message output from each of the setting-needed devices 1 and 2 reach the setting device 4. Further, each of the relay devices 3 sets, as IP addresses, broadcast addresses to the reply messages addressed to the setting-needed devices 1 and 2 received from the setting device 4, and outputs the networks 6. It is not required that each of the relay devices 3 is a device that directly connects networks together. Of course, it is possible to use the relay devices which directly connect the network 6 together.

Figure 2A:
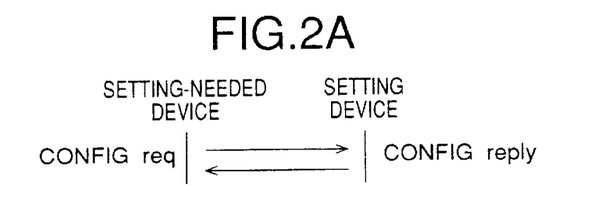
FIGS. 2A, 2B, 2C, 2D, 2E and 2F are sequence diagrams of operations according to an embodiment of the present invention.
Figure 2B:
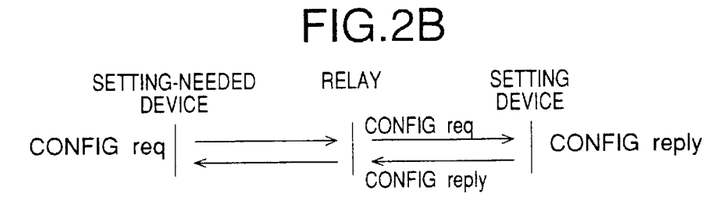
Figure 2C:
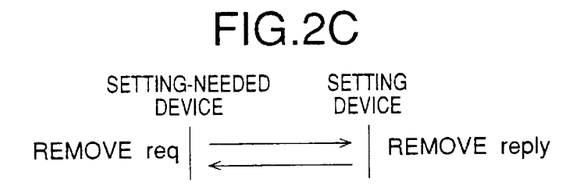
Figure 2D:
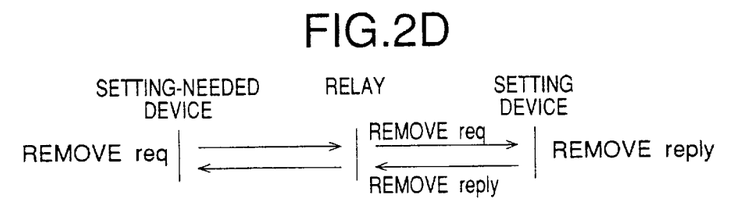
Figure 2E:
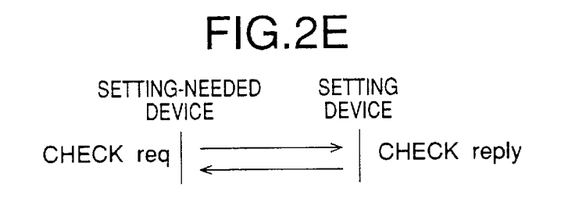
Figure 2F:
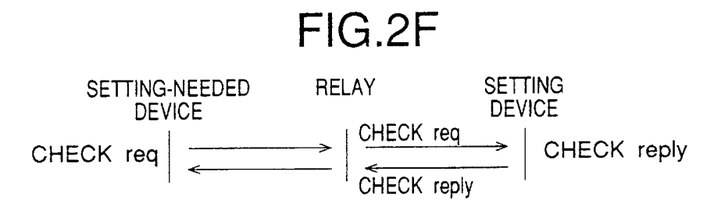

FIG. 2A shows a CONFIG req/CONFIG reply communications sequence used when the setting-needed device 1 or 2 is connected to the same network as the setting device 4. FIG. 2B shows a CONFIG req/CONFIG reply communications sequence used when the setting-needed device 1 or 2 is connected to a different network to which the setting device 4 is connected. FIG. 2C shows a REMOVE req/REMOVE reply communications sequence used when the setting-needed device 1 or 2 is connected to the same network as the setting device 4. FIG. 2D shows a REMOVE req/REMOVE reply communications sequence used when the setting-needed device 1 or 2 is connected to a different network to which the setting device 4 is connected. FIG. 2E shows a CHECK req/CHECK reply communications sequence used when the setting-needed device 1 or 2 is connected to the same network as the setting device. FIG. 2F shows a CHECK req/CHECK reply communications sequence used when the setting-needed device 1 or 2 is connected to a different network to which the setting device 4 is connected.

Figure 3:
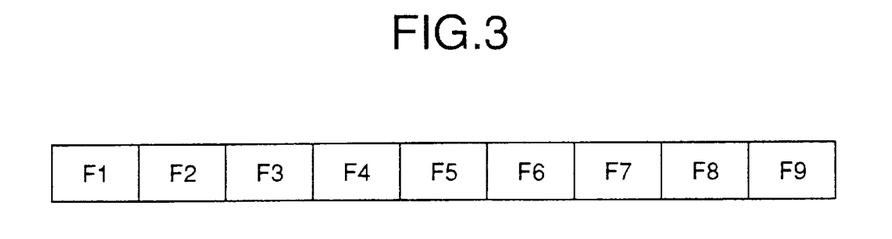
FIG. 3 is a diagram of a format of messages used in the embodiment of the present invention.

FIG. 3 shows an example of the format of the above-mentioned messages. The format shown in FIG. 3 has a maximum of nine fields F1 through F9. More particularly, the field F1 is used to store information indicating the type of message. The field F2 is used to store information concerning whether or not the IP address should be exclusively used. The field F3 is used to store the IP address of the setting-needed device 1 or 2. The field F3 may be omitted when the setting-needed device 1 or 2 broadcast the information request message. The field F4 is used to store the IP address of the setting device 4. The field F5 is used to store the IP address of the relay device 3. The field F6 is used to store the host name of the setting-needed device 1 or 2. The field F6 may be omitted. The field F7 is used to store the host name of the setting device 4. The field F8 is used to store a password. The field F9 is used to store the network environment information which is, for example, the address of the name server 7, the table of the correspondence between host name and IP address of another device or the like.

Figure 4:
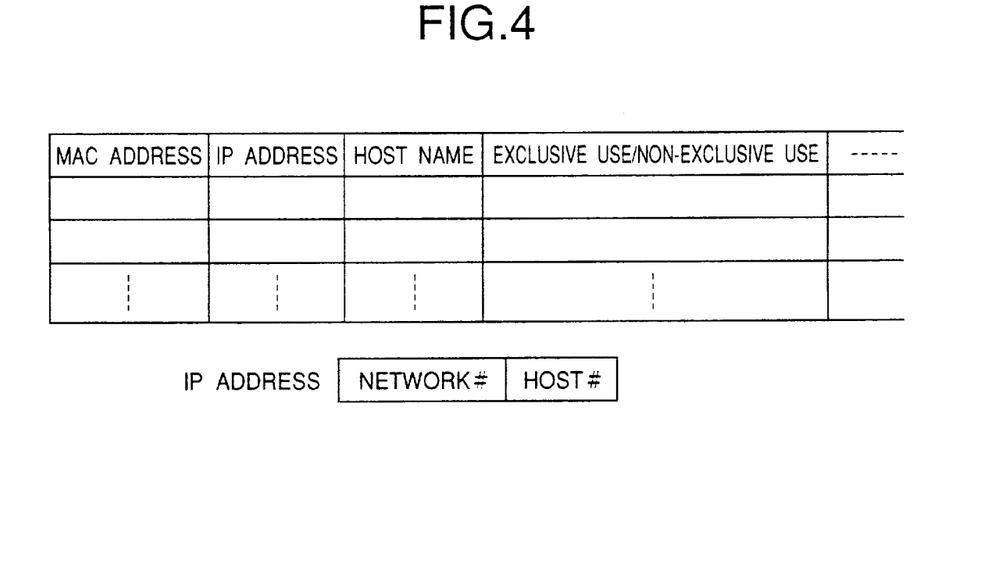
FIG. 4 is a diagram of a database managed by a setting device shown in FIGS. 1A and 1B.

FIG. 4 shows an example of a database (DB) managed by the setting device 4. The setting device 4 manages the address information and the network environment information necessary for the setting-needed device 1 or 2 to use the TCP/IP network environment. The information managed by the setting device 4 includes a MAC (Media Access Control) address forming a 48-bit physical address, the IP address consisting of 32 bits, the host name formed by a character string used to discriminate the hosts (devices connected to the networks 6) from each other, and an exclusive-use/non-exclusive use indication indicating whether or not the IP address and the host name are exclusively used for a particularly one device. The items of the above information are managed by the setting device 4 in a table format shown in FIG. 4. The IP address is made up of the network number and the host number exclusively assigned in the networks 6 so that the devices have different host numbers.

Figure 5:
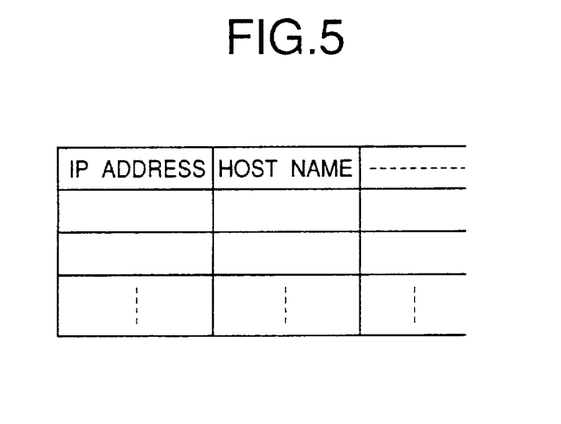
FIG. 5 is a diagram of a correspondence table managed by a name server shown in FIGS. 1A and 1B.

FIG. 5 shows a correspondence table managed by the name server 7. The correspondence table shown in FIG. 5 is also used in the prior art. The name server 7 manages the correspondence between the IP address and the host name, and has the function of notifying a device of information concerning a requested correspondence requested by the above device.

Figure 6:
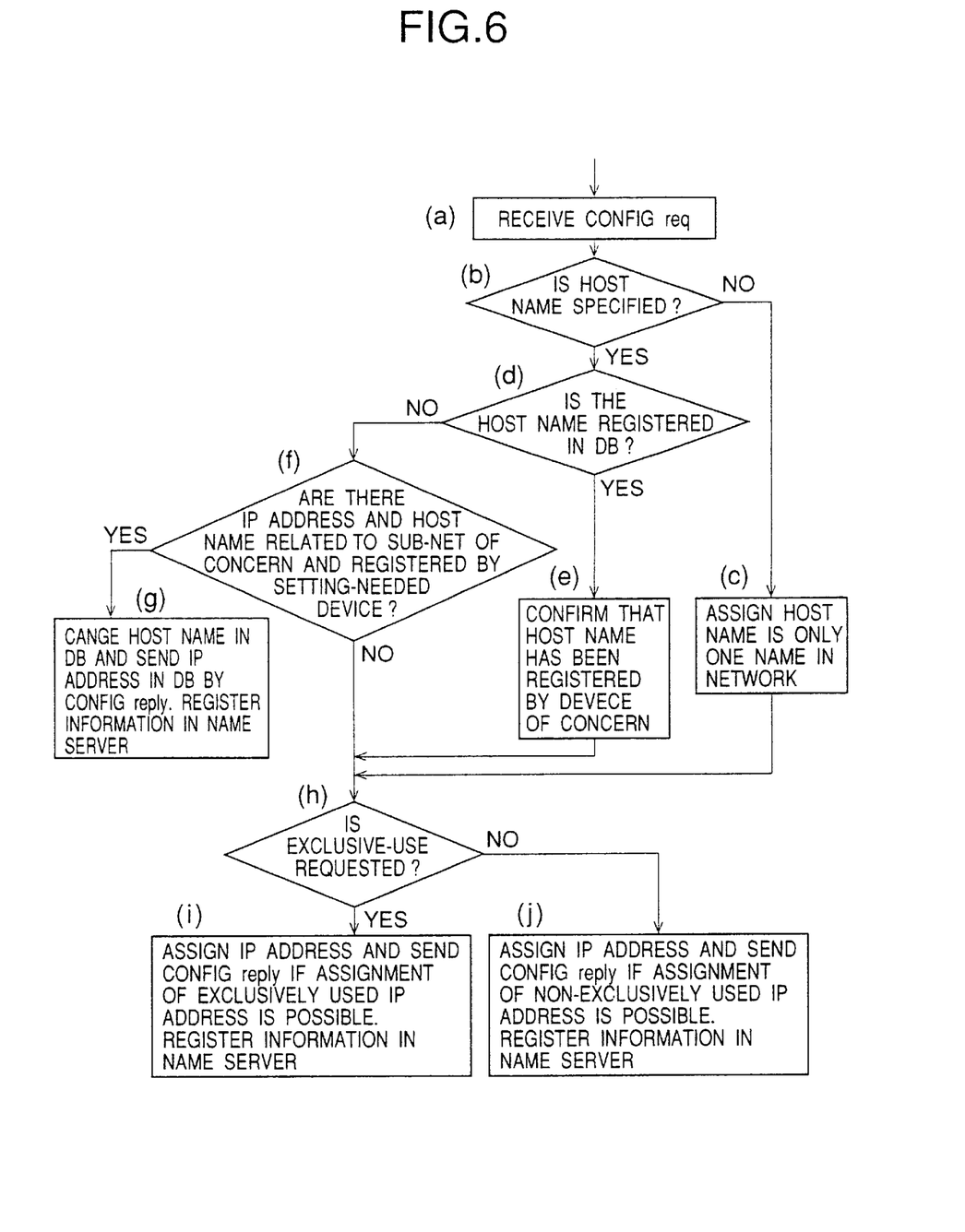
FIGS. 6, 7 and 8 are flowcharts of the operations of the embodiment of the present invention.
Figure 7:
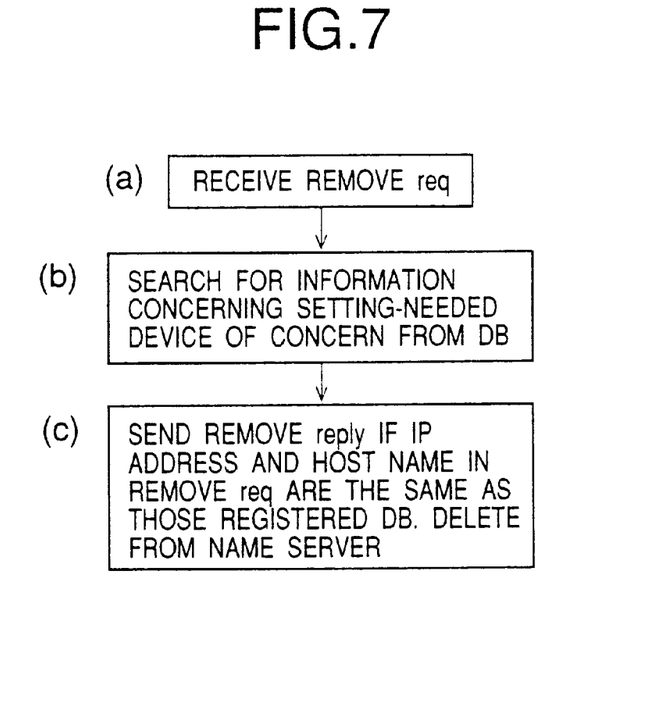
Figure 8:
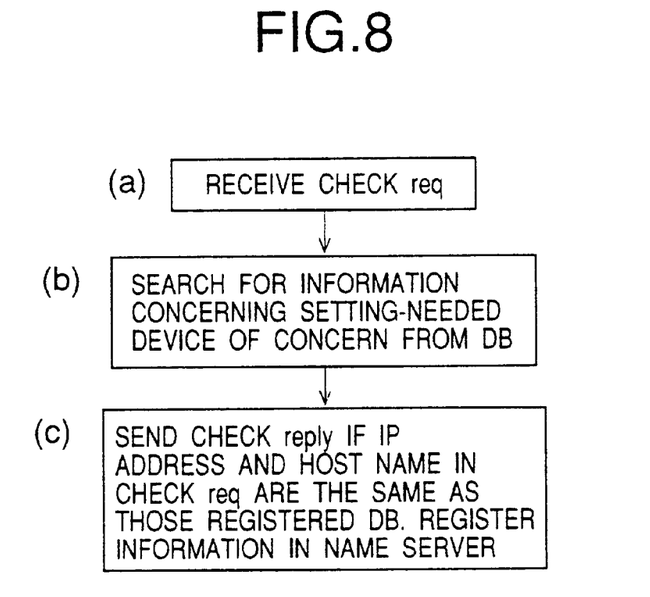

FIGS. 6, 7 and 8 are flowcharts of processes respectively performed by the setting device 4 when receiving the CONFIG req message, the REMOVE req message and CHECK req message from the setting-needed device 1 or 2. In FIGS. 6 through 8, the symbol "DB" denotes the address information of the setting-needed device 1 or 2, such as the IP address and the host name, the network environment information and the database indicating the correspondence between the address information and the network environment information.

In step (a) shown in FIG. 6, the setting device 4 receives the CONFIG req message from the setting-needed device 1 or 2. In step (b), the setting device 4 determines whether or not the host name is specified in the received message. When it is determined that the host name is specified in the received message, the setting device 4 proceeds to step (d). When it is determined that the host name is not specified in the received message, the setting device 4 assigns an exclusive host name to the setting-needed device of concern, the exclusive host name being exclusively used in the networks 6. Then, the setting device 4 proceeds to step (h).

In step (d), when the host name is specified in the received message, the setting device 4 determines whether or not the specified host name has been registered in the database managed by the setting device 4. When it is determined that the specified host name has not been registered in the database, the setting device 4 proceeds to step (f). In step (e), when the host name has been registered in the database managed by the setting device 4, the setting device 4 confirms that the device which has registered the host name is the device which sent the setting device 4 the CONFIG req message being considered. Then, the setting device 4 proceeds to step (h).

In step (g), when there is the registered IP address and host name, the setting device 4 determines that the received CONFIG req message requests change of the host name, and changes the host name registered in the database. Then, the setting device 4 writes the new IP in the database into the CONFIG reply message and sends it to the setting-needed device 1 or 2 being considered. Then, the setting device 4 instructs the name server 7 to register therein the correspondence between the new host name and the IP address.

In step (h), the setting device 4 determines whether or not it is requested to exclusively use the IP address. When the exclusive use is requested, the setting device 4 proceeds to step (i). When the non-exclusive use is requested, the setting device 4 proceeds to step (j).

In step (i), if the requested exclusive use is possible, the setting device 4 assigns the IP address, and writes information made to correspond to the specified host name, the registered host name or newly assigned host name in the CONFIG reply message, and sends it to the setting-needed device 1 or 2 being considered. Then the setting device 4 ends the process.

In step (j), if the requested non-exclusive use is possible, the setting device 4 assigns the IP address, and writes information made to correspond to the specified host name, the registered host name or newly assigned host name in the CONFIG reply message, and sends it to the setting-needed device 1 or 2 being considered. Further, the setting device 4 registers in the name server 7 the information concerning the correspondence between the IP address and the host name.

In receipt of the REMOVE req message from the setting-needed device 1 or 2, the setting device 4 operates in the sequence shown in FIG. 7. In step (a), the setting device 4 receives the REMOVE req message from the setting-needed device 1 or 2. In step (b), the setting device 4 searches for information concerning the setting-needed device 1 or 2 of concern by using, as key information, the MAC address, the IP address or the host name. In step (c), if the MAC address, the IP address and the host name are the same as corresponding those registered in the database, the setting device 4 removes the information, and sends back the REMOVE reply message to the setting-needed device 1 or 2 of concern. Further, the setting device 4 requests the name server 7 to delete information concerning the correspondence between the IP address and the host name, and ends the process.

In receipt of the CHECK req message from the setting-needed device 1 or 2, the setting device 4 operates in the sequence shown in FIG. 8. In step (b), the setting device 4 receives the CHECK req message from the setting-needed device 1 or 2. In step (b), the setting device 4 searches for information concerning the setting-needed device 1 or 2 of concern by using, as key information, the MAC address, the IP address or the host name. In step (c), if the MAC address, the IP address and the host name are the same as corresponding those registered in the database, the setting device 4 collects the registered information and sends back the CHECK reply message to the setting-needed device 1 or 2. If necessary, the setting device 4 requests the name server 7 to register therein information concerning the performed confirmation.

Figure 9:
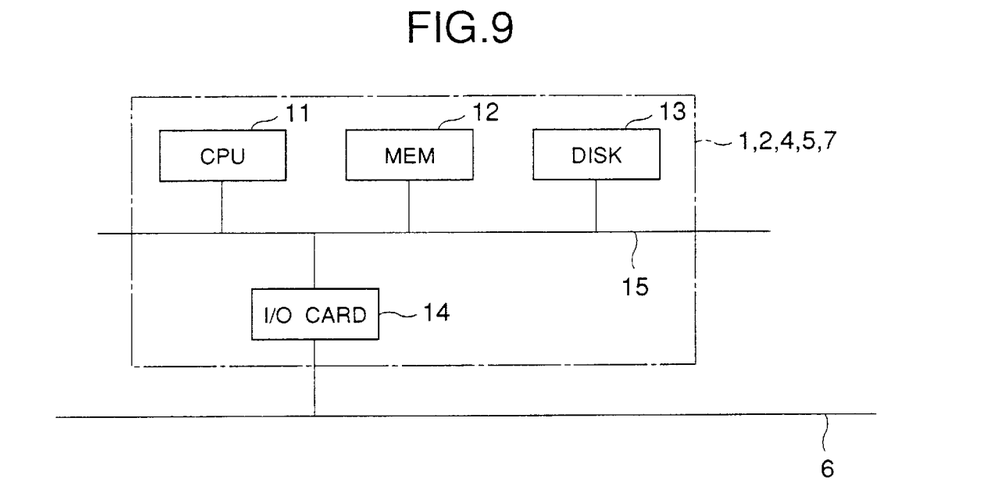
FIG. 9 is a block diagram of a portable device, a setting device, a business device and a name server shown in FIGS. 1A and 1B.

FIG. 9 is a block diagram of each of the structures of the portable devices 1 and 2, the setting device 4, the business device 5 and the name server 7 shown in FIGS. 1A and 1B. Each of these devices is made up of a CPU (Central Processing Unit) 11, a memory (MEM) 12, a disk storage device (DISK) 13, a network interface card (I/O card) 14 and a bus 15. The memory 12 includes a ROM which stores programs executed by the CPU 11, and a RAM serving as a work memory of the CPU 11. The network interface card 14 connects the device to the network 6. The disk storage device 13 of the portable device includes a programmable ROM stores the address information and the network environment information supplied from the setting device 4.

Figure 10:
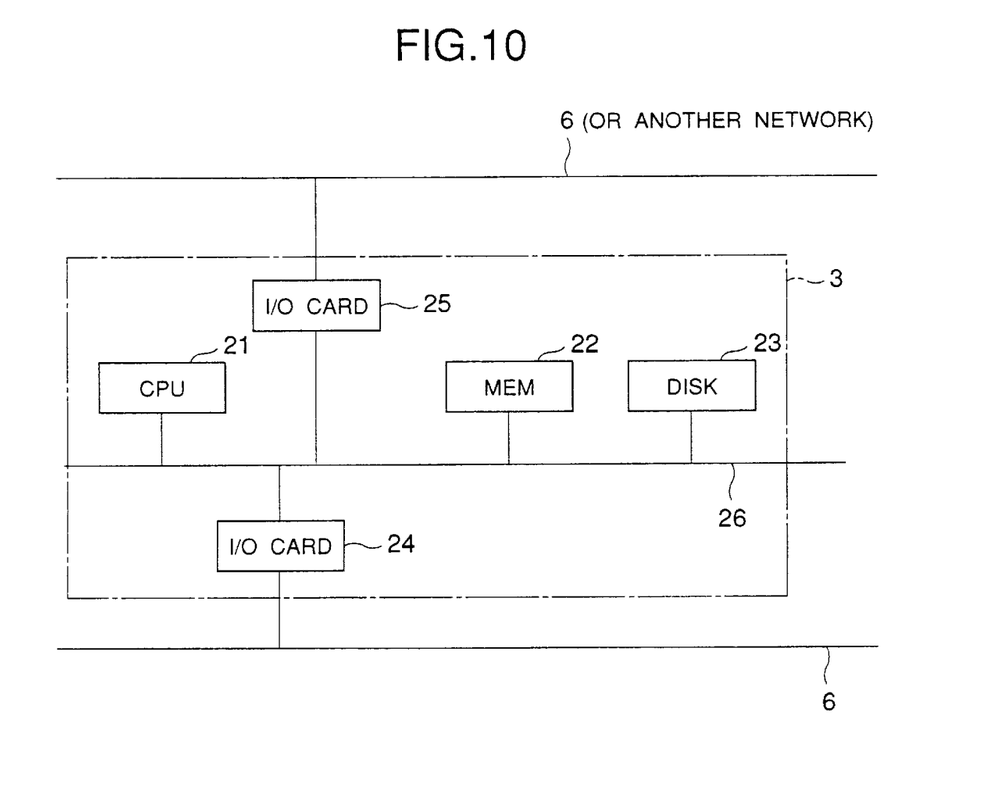
FIG. 10 is a block diagram of a relay device shown in FIGS. 1A and 1B.

FIG. 10 is a block diagram of the structure of the relay devices 3 shown in FIGS. 1A and 1B. Each of the relay devices 3 is made up of a CPU 21, a memory 12, a disk storage device 23, a network interface card 24, two network interface cards 24 and 25, and a bus 26. The memory 22 includes a ROM which stores programs executed by the CPU 21, and a RAM serving as a work memory of the CPU 21. The network interface card 24 connects the relay device 3 to the network 6, and the network interface card 24 connects the relay device 3 to another network connected to another relay device 3 (in the case shown in FIGS. 1A and 1B) or the network 6 different from the network 6 to which the network interface card 24 is connected.

According to the present invention, it is possible to rapidly and correctly perform the setting of the address information and the network environment information with respect to portable devices directly if the portable devices are connected to the same network as the setting device, or via the relay device or devices if the portable devices are connected to a network different from the network to which the setting device is connected. Further, it is possible for the portable devices to use, even after the movement of the portable devices, the same host name as that used before the movement thereof and to operate under the same environment as the previous environment. Hence, the present invention greatly contributes to improvements in portability of devices used in the TCP/IP network and in reductions of the work of the operator and/or the system engineer.

The present invention is not limited to the specifically disclosed embodiments, and variations and modifications may be made without departing from the scope of the present invention.

What is claimed is:

1. A method for automatically determining address information and network environment information in an internetwork of networks mutually connectable to each other under a network environment, said internetwork having at least one setting device, said method comprising:

(a) managing, in said setting device connected to one of the networks, address information and network environment information used for each device connected to each network to operate under the network environment, the network environment information including information unique to each network, including protocol information;

(b) sending, from a setting-needed device moved from one of the networks to another network or newly joined to one of the networks, a request message for requesting address information and network environment information to said setting device;

(c) establishing, in said setting device, a correspondence between a host name of the setting-needed device and a network address of the setting-needed device and sending back a reply message to the setting-needed device from the setting device, the reply message including the address information containing the host name and the network address of the setting-needed device and the network environment information;

(d) storing, in the setting-needed device, the address information and the network environment information sent from said setting device, so that the setting-needed device can operate under the network environment; and (e) reconfiguring the networks of the internetwork based on the information stored at step (d) to accommodate the setting-needed device after being moved from one of the networks to another one of the networks or newly joined to one of the networks, wherein said network environment information includes a domain name of a naming device and a community name of a network management protocol.

2. The method of claim 1, wherein:

the step (b) comprises the step of sending the request message containing a host name to the setting device; and the step (c) comprises the step of:
 determining whether or not the host name can be used to the setting-needed device which sent the request message in the step (b); and
 making the correspondence between the host name and the network address of the setting-needed device when the name can be used.

3. The method of claim 1, wherein:

the step (b) comprises the step of containing an exclusive-use/non-exclusive use information in the request message, the exclusive-use/non-exclusive use information indicating whether or not the network address is allowed to be used by another device after a predetermined time; and the step (c) comprises the step of assigning the network address on the basis of the exclusive-use/non-exclusive use information.

4. A system for automatically determining address information and network environment information in networks mutually connectable to each other under a predetermined protocol network environment, the system comprising:

first means for managing, in a setting device connected to one of the networks, address information and network environment information used for each device connected to one of the networks to operate under the predetermined protocol network environment;

second means for sending, from a setting-needed device moved from one of the networks to another network or newly joined to one of the networks, a request message for requesting address information and network environment information from the setting device;

third means for making, in the setting device, a correspondence between a host name of the setting-needed device and a network address of the setting-needed device and sending back a reply message to the setting-needed device from the setting device, the reply message containing address information containing a host name and a network address of the setting-needed device and network environment information; and fourth means for storing, in the setting-needed device, the address information and the network environment information sent from the setting device, so that the setting-needed device can operate under the predetermined network environment, wherein said network environment information includes a domain name of a naming device and a community name of a network management protocol.

5. The system of claim 1, wherein:

the second means comprises means for sending the request message containing a host name to the setting device; and the third means comprises means for determining whether or not the host name can be used to the setting-needed device which sent the request message and for making the correspondence between the name and the network address of the setting-needed device when the host name can be used.

6. The system of claim 4, wherein:

the second means comprises means for containing an exclusive-use/non-exclusive use information in the request message, the exclusive-use/non-exclusive use information indicating whether or not the network address is allowed to be used by another device after a predetermined time; and the third means comprises means for assigning the network address on the basis of the exclusive-use/non-exclusive use information.

7. A method for automatically determining address information and network environment information in sub-networks of a network wherein the sub-networks are mutually connectable to each other under a predetermined protocol, comprising the steps of:

(a) sending a request message from a portable device to the local manager for address information and network environment information, the portable device having been moved from one sub-network to another sub-network or newly joined to one of the sub-networks;

(b) making a correspondence in the local manager between a host name of the portable device and a network address of the portable device;

(c) sending back a reply message from the local manager to the portable device containing the host name and the network address of the portable device as determined in step (b) and other network information;

(d) storing the address and network environment information in the portable device so that the portable device can operate under the predetermined network environment, wherein said network environment information includes a domain name of a naming device and a community name of a network management protocol.

8. The method of claim 7, further comprising the step of: connecting a plurality of sub-networks using gateways.

9. A method for determining identifying information in a network composed of sub-networks so as to enable the automatic connection of a portable device to a second sub-network having been moved from a first sub-network or newly joined, comprising the steps of:

(a) communicating between a local network manager and the portable device wherein the local manager makes a correspondence between a host name of the portable device and a network address of the portable device and sends back to the portable device such correspondence along with other network environment information;

(b) setting the portable device with such environment information so that the device can operate under a network environment, wherein said network environment information includes a domain name of a naming device and a community name of a network management protocol.

* * * * *